United States Patent
Mo et al.

(10) Patent No.: US 8,786,564 B2
(45) Date of Patent: Jul. 22, 2014

(54) TOUCH STYLUS, TOUCH DETECTION METHOD AND TOUCH DETECTION SYSTEM

(75) Inventors: Lianghua Mo, Shenzhen (CN); Huaiyi Xu, Shenzhen (CN); Jincheng Tian, Shenzhen (CN); Huadong Dai, Shenzhen (CN); Xinxi Jiang, Shenzhen (CN); Hua Li, Shenzhen (CN)

(73) Assignee: Focaltech Systems, Ltd., Grand Caymen (KY)

( * ) Notice: Subject to any disclaimer, the term of this patent is extended or adjusted under 35 U.S.C. 154(b) by 124 days.

(21) Appl. No.: 13/428,910

(22) Filed: Mar. 23, 2012

(65) Prior Publication Data
US 2013/0169601 A1 Jul. 4, 2013

(30) Foreign Application Priority Data
Dec. 29, 2011 (CN) .......................... 2011 1 0452282

(51) Int. Cl.
*G06F 3/041* (2006.01)
(52) U.S. Cl.
USPC .......................................... 345/173; 345/179
(58) Field of Classification Search
CPC ......... G06F 3/038; G06F 3/044; G06F 3/033; G06F 3/041
USPC ................. 345/156, 173, 174, 179; 178/18.01–18.06, 19.01
See application file for complete search history.

(56) References Cited

U.S. PATENT DOCUMENTS

| | | | |
|---|---|---|---|
| 5,528,002 A * | 6/1996 | Katabami | 178/19.06 |
| 6,147,680 A * | 11/2000 | Tareev | 345/173 |
| 2008/0106520 A1* | 5/2008 | Free et al. | 345/173 |
| 2008/0156546 A1* | 7/2008 | Hauck | 178/19.01 |
| 2010/0170726 A1* | 7/2010 | Yeh et al. | 178/19.03 |
| 2013/0033461 A1* | 2/2013 | Silverbrook | 345/179 |
| 2013/0207939 A1* | 8/2013 | Kremin et al. | 345/179 |

* cited by examiner

*Primary Examiner* — Pegeman Karimi
(74) *Attorney, Agent, or Firm* — Harness, Dickey & Pierce, P.L.C.

(57) ABSTRACT

The embodiments of the present invention disclose a touch stylus, a touch detection method and a touch detection system, which are suitable to be used for writing on a capacitive touch screen and can increase the success rate of touch. A method according to an embodiment of the present invention includes: receiving, by a sensing electrode, a square wave signal sent from a stylus tip of a touch stylus; performing a detection process on the square wave signal, by a sensing detection unit, the sensing detection unit having a clock synchronized with a clock of the touch stylus; determining, by a signal processing unit, whether a touch event occurs according to the square wave signal processed with the detection process; and calculating position coordinates of the touch event and reporting the position coordinates to a system control unit, by the signal processing unit, if a touch event occurs.

10 Claims, 4 Drawing Sheets

TOUCH STYLUS, TOUCH DETECTION METHOD AND TOUCH DETECTION SYSTEM

This application claims the benefit of Chinese patent application No. 201110452282.5 titled "TOUCH STYLUS, TOUCH DETECTION METHOD AND TOUCH DETECTION SYSTEM" and filed with the State Intellectual Property Office on Dec. 29, 2011, which is incorporated herein by reference in its entirety.

FIELD OF THE INVENTION

The present invention relates to the field of touch technology, and in particular to a touch stylus, a touch detection method and a touch detection system.

BACKGROUND OF THE INVENTION

Capacitive touch screens have been widely applied in consumer electronics such as smart phones and Mobile Internet Devices (MIDs). Generally, a capacitive touch screen is operated by touching it with a finger, which is natural for humans. However, on some occasions, especially when one wants to write, finger touching is not suitable, because, for example, touching a capacitive touch screen with a finger does not provide good accuracy, cannot be performed on a relatively small surface, and does not permit signature signing.

Moreover, since humans are accustomed to writing with a pen after the long history of writing, and capacitive touch screens become the most prominent touch screen products currently on market, touch styluses compatible with capacitive touch screens are in urgent need. However, the touch styluses commercially available function the same as a human finger, i.e., touching the capacitive touch screen to change the capacitance of the capacitive touch screen. This method requires a minimum contact area between the touch stylus and the capacitive touch screen to provide a certain interaction strength, which is generally a circular area with a diameter larger than 5 mm, adding a relatively high requirement to the touch stylus. As a result, most styluses commercially available have a tip larger than 5 mm, making the way that they operate almost identically to a finger. Hence, these touch styluses have the same problems as a human finger, i.e., they cannot be used on a relatively small surface or to sign a signature.

In the prior art, there is another type of touch stylus, which has a tip consisting of soft bristles about 1 mm long. These soft bristles are made of an electrically conducting material. When this type of touch stylus touches a capacitive touch screen, the soft bristles are pressed down, creating a larger contact area. However, the soft bristles are independent from each other, with a gap between, thus they cannot contact the capacitive touch screen at every point even when they are pressed down, which lowers the effective contact area and reduces the success rate of operating the capacitive touch screen with the touch stylus.

SUMMARY OF THE INVENTION

According to an embodiment of the present invention, it is provided a touch stylus, a touch detection method and a touch detection system, which are suitable to be used for writing on a capacitive touch screen and can increase the success rate of touch.

In one aspect, according to an embodiment of the present invention, it is provided a touch stylus, including: a stylus tip and a stylus body, wherein, the stylus tip is connected to the stylus body, the stylus body is provided with a cavity in which a driving circuit board and a battery are arranged, the driving circuit board is electrically connected to the stylus tip, the battery is adapted to supply electrical energy to the driving circuit board, and the driving circuit board is adapted to generate a square wave signal and send the square wave signal to a touch detection system through the stylus tip, so that the touch detection system determines whether a touch event occurs according to the square wave signal.

In another aspect, according to an embodiment of the present invention, it is provided a touch detection method, including:

receiving, by a sensing electrode, a square wave signal sent from a stylus tip of a touch stylus;

performing a detection process on the square wave signal, by a sensing detection unit, the sensing detection unit having a clock synchronized with a clock of the touch stylus;

determining, by a signal processing unit, whether a touch event occurs according to the square wave signal processed with the detection process; and calculating position coordinates of the touch event and reporting them to a system control unit, by the signal processing unit, if a touch event occurs.

In another aspect, according to an embodiment of the present invention, it is provided a touch detection system, including: a sensing electrode, a sensing detection unit, and a signal processing unit, wherein, the sensing electrode is adapted to receive a square wave signal sent from a stylus tip of a touch stylus;

the sensing detection unit is adapted to perform a detection process on the square wave signal and send the processed square wave signal to the signal processing unit, the sensing detection unit having a clock synchronized with a clock of the touch stylus;

the signal processing unit is adapted to determine whether a touch event occurs according to the square wave signal processed with the detection process; and the signal processing unit is further adapted to calculate position coordinates of the touch event and report them to a system control unit if a touch event occurs.

It can be seen from the above technical solutions the embodiments of the present invention may bring the following advantages.

According to an embodiment of the present invention, a driving circuit board of the touch stylus generates a square wave signal, and the tip of the touch stylus sends the square wave signal to a touch detection system, so that the touch detection system can determine whether a touch event occurs according to the square wave signal. In this embodiment of the present invention, the touch stylus generates and sends the square wave signal to the touch detection system, i.e., the touch stylus functions as a sending electrode to generate the square wave signal, hence the touch detection system can determine whether a touch event occurs according to the touch stylus, without the requirement of a touch stylus or a human finger touching the touch detection system to change the capacitance of the touch detection system. As a result, it is no longer needed for the contact area between the touch stylus or the human finger and the touch detection system to be a circular area with a diameter of at least 5 mm. Therefore, the touch stylus provided by the embodiment of the present invention permits touch actions having good accuracy, provides a high success rate of touch, and is suitable to be used on the occasion when one wants to write.

According to another embodiment of the present invention, a sensing electrode of the touch detection system receives a square wave signal form the tip of a touch stylus, a sensing detection unit performs a detection process on the square wave signal, and a signal processing unit determines whether a touch event occurs according to the square wave signal processed with the detection process and calculates position coordinates of the touch event and report them to a system control unit if a touch event occurs. In this embodiment of the present invention, the touch stylus functions as a sending electrode to send the square wave signal, and the touch detection system determines whether a touch event occurs according to the square wave signal sent from the touch stylus, instead of the touch detection system itself providing a sending electrode to send a square wave signal and receiving a square wave signal through an own receiving electrode, without the requirement of a touch stylus or a human finger touching the touch detection system to change the capacitance of the touch detection system. As a result, it is no longer needed for the contact area between the touch stylus or the human finger and the touch detection system to be a circular area with a diameter of at least 5 mm. Therefore, the touch stylus provided by the embodiment of the present invention permits touch actions having good accuracy, provides a high success rate of touch, and is suitable to be used on the occasion when one wants to write.

BRIEF DESCRIPTION OF THE DRAWINGS

For a better understanding of the technical solutions provided by the embodiments of the present invention, accompanying drawings used in the descriptions of the embodiments are briefly described below. As a matter of course, the accompanying drawings described below are merely some of the possible embodiments of the present invention, and other drawings may be obtained by those skilled in the art based on these drawings.

DETAILED DESCRIPTION OF THE INVENTION

According to the embodiments of the present invention, it is provided a touch stylus, a touch detection method and a touch detection system, which are suitable to be used for writing on a capacitive touch screen and can increase the success rate of touch.

The objects, features and advantages of the present invention will become more apparent with the description below of the technical solutions according to the embodiments of the present invention in conjunction with the accompanying drawings of the embodiments. As a matter of course, the embodiments described below are merely some of the possible embodiments of the present invention. Any other embodiment obtained by those skilled in the art based on the embodiments herein shall fall within the scope of protection of the present invention.

Figure 1:
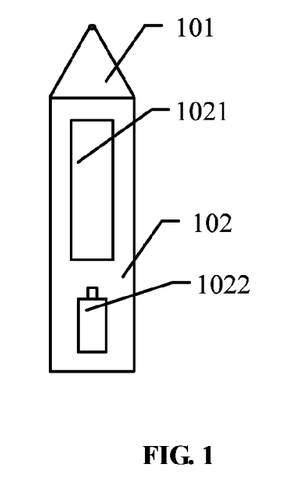
FIG. 1 is a schematic structural diagram of a touch stylus according to an embodiment of the present invention.

As shown in FIG. 1, a touch stylus provided by an embodiment of the present invention includes: a stylus tip 101 and a stylus body 102.

Specifically, the stylus tip 101 is connected to the stylus body 102, the stylus body is provided with a cavity 102 in which a driving circuit board 1021 and a battery 1022 are arranged, the driving circuit board 1021 is electrically connected to the stylus tip 101, the battery 1022 is adapted to supply electrical energy to the driving circuit board 1021, and the driving circuit board 1021 is adapted to generate a square wave signal and send the square wave signal to a touch detection system through the stylus tip 101, so that the touch detection system determines whether a touch event occurs according to the square wave signal.

It is noted that, the touch stylus according to the embodiment of the present invention is provided with a driving circuit board and a battery. To distinguish from the existing touch stylus in the prior art, the touch stylus provided by the embodiment of the present invention may be referred to as an "active stylus", while the touch stylus in the prior art may be referred to as a "passive stylus". Differences between the active stylus provided by the embodiment of the present invention and the passive stylus in the prior art include that, the active stylus can function as a sending electrode to generate and send a square wave signal to the touch detection system, while the passive stylus touches the capacitive touch screen to change the capacitance of the capacitive touch screen, which is similar to the function of a human finger, with the touch detection system providing a sending electrode and a receiving electrode; and that, the passive stylus requires the contact area with the touch detection system to be a circular area with a diameter of at least 5 mm, while the active stylus does not have any requirements on the contact area. Therefore, the touch stylus provided by the embodiment of the present invention permits touch actions having good accuracy, provides a high success rate of touch, and is suitable to be used on the occasion when one wants to write.

According to an embodiment of the present invention, the stylus body may have a cylinder-shaped cavity; the stylus tip may have a conical structure, the stylus tip may be relatively thin at its front end and the sharpest part may be a smooth circular arc with a diameter of about 1 mm, and the stylus tip may be relatively wide at its back end with a diameter of about 10 mm. The stylus tip may have a shape similar to ordinary ballpoint pens or sharpened pencils. Since humans are accustomed to writing with a pen after the long history of writing, the touch stylus provided by the embodiment of the present invention can fit human writing habits better, and make writing more convenient.

According to an embodiment of the present invention, the material of the stylus tip may be a metal such as copper and stainless steel; or may be some other electrically conducting material such as an electrically conducting plastic. Or the stylus tip may have a structure including a non-conducting body and an electrically conducting coating on the non-conducting body; or may have a structure including a non-conducting body, an electrically conducting coating on the non-conducting body, and further a thin non-conducting layer on the electrically conducting coating. The specific structure of the stylus tip in a practical application can be determined according to actual needs, which is therefore not to be defined herein.

Figure 2:
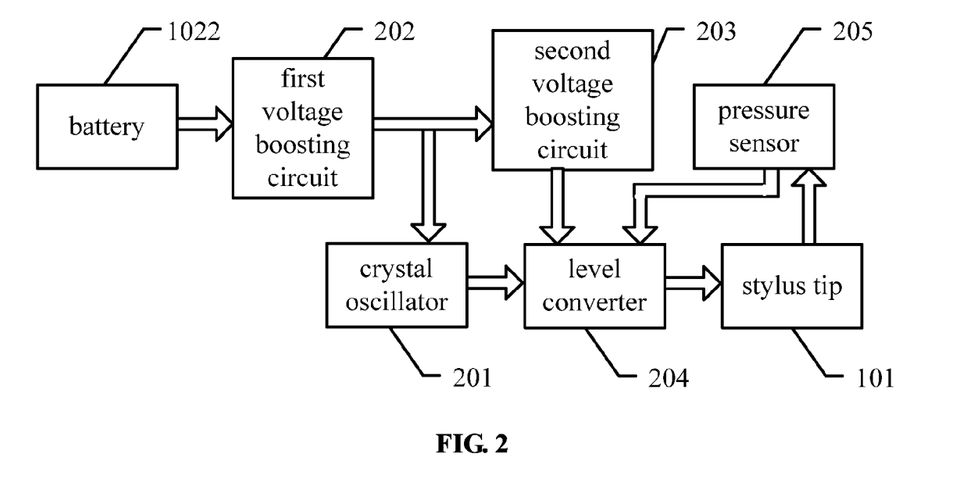
FIG. 2 is a schematic structural diagram of a driving circuit board in a touch stylus according to an embodiment of the present invention.

It is noted that, the function of the driving circuit board according to the embodiment of the present invention includes generating a square wave signal, which is sent by the stylus tip of the touch stylus, as a sending electrode, to the touch detection system. As shown in FIG. 2, the driving circuit board of FIG. 1 may have a structure as shown in FIG. 2, a schematic structural diagram of the driving circuit board. The driving circuit board may include a crystal oscillator 201, a first voltage boosting circuit 202, a second voltage boosting circuit 203 and a level converter 204.

The first voltage boosting circuit 202 is connected to the battery 1022, and the battery 1022 supplies electrical energy to the first voltage boosting circuit 202.

The first voltage boosting circuit 202 is connected to the crystal oscillator 201, and supplies electrical energy to the crystal oscillator 201.

The second voltage boosting circuit 203 is connected to the first voltage boosting circuit 202, is connected to the level converter 204, and supplies electrical energy to the level converter 204.

The level converter 204 is connected to the crystal oscillator 201, and is adapted to perform level conversion on a square wave signal output by the crystal oscillator 201 and send the processed square wave signal to the stylus tip.

It is noted that, the output voltage of the battery in the touch stylus is generally 1.2V, which may be boosted to 3.3V by the first voltage boosting circuit; the first voltage boosting circuit sends the 3.3V voltage to the crystal oscillator and the second voltage boosting circuit, and the crystal oscillator may generate a square wave signal ranging from tens of KHz to hundreds of KHz, e.g., 76.8 KHz; the second voltage boosting circuit boosts the 3.3V voltage to 24V and then sends to the level converter; the level converter raises the signal level and improves the driving capability, and outputs a 24V square wave signal, which is sent by the stylus tip of the touch stylus, as a sending electrode.

It is noted that, as shown in FIG. 2, the driving circuit board may further include a pressure sensor 205 connected to the level converter. The pressure sensor 205 is adapted to collect the magnitude of the pressure in the touch detection system through the stylus tip 101, and send it to the level converter 204. The pressure sensor 205 may adjust, according to the magnitude of the pressure collected from the stylus tip, the amplitude of the square wave signal output by the level converter; and the touch detection system may restore the amplitude of the received square wave signal to a pressure signal and report it to the system control unit. For example, when the pressure on the touch stylus used increases, the amplitude of the square wave signal output by the touch stylus increases, which further leads to increase of the pressure signal restored by the touch detection system from the amplitude of the received square waved signal; hence, once the pressure system reports the pressure signal to the system control unit, the stroke displayed on the capacitive touch screen thickens. It is the other way around if the pressure on the touch stylus used decreases.

It is noted that, the touch stylus provided by an embodiment of the present invention may further include a control switch connected to the driving circuit board. When the control switch is closed, the stylus tip sends a square wave signal to the touch detection system; and when the control switch is open, the stylus tip stops sending the square wave signal to the touch detection system. The operation status of the touch stylus may be controlled through the control switch; and by turning off the control switch when the touch stylus is not needed, electricity in the battery can be saved and the service life of the battery can be extended.

It is noted that, the touch stylus provided by an embodiment of the present invention may further include an indicating device connected to the driving circuit board. The indicating device is adapted to indicate the operation status of the touch stylus, so that the user can learn the operation status of the touch stylus easily through the indicating device. For example, the indicating device may be a Light-Emitting Diode (LED) lamp for indicating the current operation status of the touch stylus. For example, the LED lamp may indicate that the touch stylus is in an operating state by staying lit or by flashing, or may indicate that the touch stylus is currently not sending a square wave signal by being off.

According to an embodiment of the present invention, a driving circuit board of the touch stylus generates a square wave signal, and the tip of the touch stylus sends the square wave signal to a touch detection system, so that the touch detection system can determine whether a touch event occurs according to the square wave signal. In the embodiment of the present invention, the touch stylus generates and sends the square wave signal to the touch detection system, i.e., the touch stylus functions as a sending electrode to generate the square wave signal, hence the touch detection system can determine whether a touch event occurs according to the touch stylus, without the requirement of a touch stylus or a human finger touching the touch detection system to change the capacitance of the touch detection system. As a result, it is no longer needed for the contact area between the touch stylus or the human finger and the touch detection system to be a circular area with a diameter of at least 5 mm.

Therefore, the touch stylus provided by the embodiment of the present invention permits touch actions having good accuracy, provides a high success rate of touch, and is suitable to be used on the occasion when one wants to write.

Figure 3:
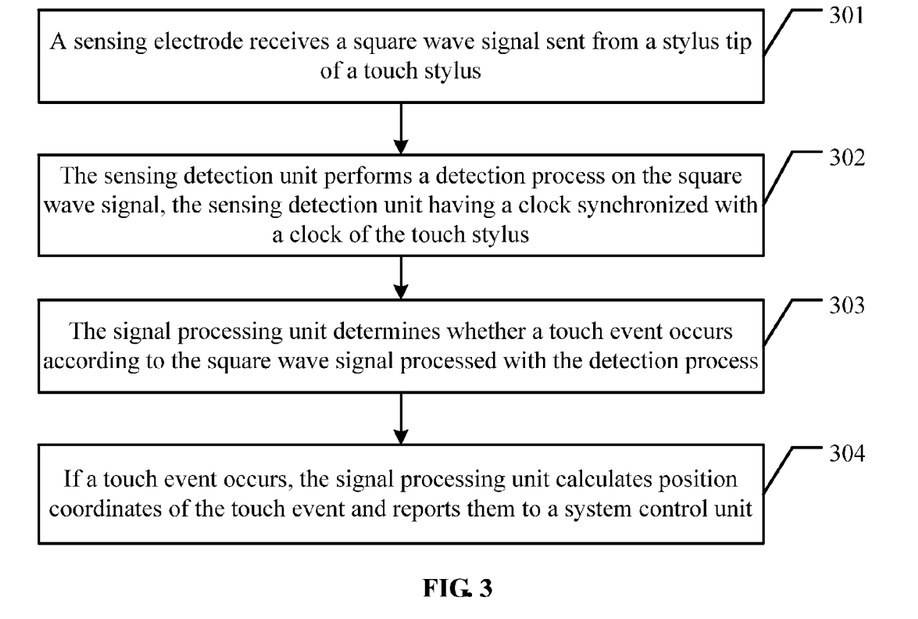
FIG. 3 is a schematic diagram of a touch detection method according to an embodiment of the present invention.

A touch stylus provided by an embodiment of the present invention is described above, and a touch detection method provided by an embodiment of the present invention will be described hereinafter. As shown in FIG. 3, the touch detection method may include the following steps.

301. A sensing electrode receives a square wave signal sent from a stylus tip of a touch stylus.

According to an embodiment of the present invention, the stylus tip of the touch stylus sends a square wave signal to the touch detection system, the sensing electrode of the touch detection system receives the square wave signal sent from the stylus tip of the touch stylus, and then the sensing electrode sends the square wave signal to a sensing detection unit.

302. The sensing detection unit performs a detection process on the square wave signal, the sensing detection unit having a clock synchronized with a clock of the touch stylus.

According to an embodiment of the present invention, the sensing detection unit performs a detection process on the square wave signal received by the sensing electrode, which includes converting the square wave signal into a voltage signal and sending it to a signal processing unit.

It is noted that, according to an embodiment of the present invention, the clock of the sensing detection unit is synchronized with the clock of the touch stylus, which requires the square wave signal obtained by the sensing detection unit from the sensing electrode to be synchronized in phase. In practice, the synchronization between the clock of the sensing detection unit and the clock of the touch stylus may be realized in the following way:

A1. a band-pass filter performs frequency selection on the square wave signal;

A2. an amplifier amplifies the frequency-selected square wave signal; and

A3. a phase-locked loop (PLL) performs phase adjustment and frequency multiplication on the amplified square wave signal, and outputs the result to the sensing detection unit, and the sensing detection unit uses the result of frequency multiplication as the clock of the sensing detection unit.

In step A1, the band-pass filter performs frequency selection on the square wave signal received by the sensing electrode, which includes passing a portion of the square wave within a particular frequency range and sending it to the amplifier, and rejecting a portion of the square wave outside the particular frequency range. In step A2, the amplifier amplifies the frequency-selected square wave signal and then sends to the PLL. The PLL performs phase adjustment and frequency multiplication on the amplified square wave signal, and outputs the result to the sensing detection unit. The sensing detection unit uses the result of frequency multiplication as the clock of the sensing detection unit, thus achieving synchronization between the clock of the sensing detection unit and the clock of the touch stylus.

In practice, if the clock of the touch stylus is generated by a crystal oscillator, the synchronization between the clock of the sensing detection unit and the clock of the touch stylus may be realized in another way:

B1. another crystal oscillator having a frequency that is the same as the frequency of the crystal oscillator, or a multiple of the frequency of the crystal oscillator, or a unit fraction of the frequency of the crystal oscillator generates a clock and outputs it to a phase extraction control unit;

B2. the phase extraction control unit extracts phase information of the signal sent from the touch stylus from the square wave signal received by the sensing electrode;

B3. the phase extraction control unit performs phase adjustment on the clock output by said another crystal oscillator to the phase extraction control unit according to the phase information; and B4. the phase extraction control unit outputs the phase-adjusted clock to the sensing detection unit, and the sensing detection unit uses the phase-adjusted clock as its own clock.

According to step B1, the touch detection system includes another crystal oscillator having an oscillation frequency that is the same as, or a multiple of, or a unit fraction of the oscillation frequency of the crystal oscillator of the touch stylus. In step B1, said another crystal oscillator generates a clock and outputs it to the phase extraction control unit. In step B2, the phase extraction control unit extracts the phase information of the touch stylus from the square wave signal received by the sensing electrode, from which a phase difference between the touch detection system and the touch stylus can be obtained. In step B3, the phase extraction control unit performs phase adjustment on the clock output by said another crystal oscillator according to the phase information. In step B4, the phase extraction control unit outputs the phase-adjusted clock to the sensing detection unit, and the sensing detection unit uses the phase-adjusted clock as its own clock, thus achieving synchronization between the clock of the sensing detection unit and the clock of the touch stylus.

It is noted that, according to the embodiment of the present invention, the signal detection unit and the signal processing unit are in the same touch detection system, and have synchronized clocks and signal phases. When the clock of the signal detection unit is synchronized with the clock of the touch stylus, the clock of the signal processing unit is also synchronized with the clock of the touch stylus.

303. The signal processing unit determines whether a touch event occurs according to the square wave signal processed with the detection process.

According to an embodiment of the present invention, the signal processing unit obtains the square wave signal processed with the detection process from the signal detection unit, and determines whether a touch event occurs according to the square wave signal processed with the detection process. If a touch event occurs, a subsequent step 304 is triggered.

304. If a touch event occurs, the signal processing unit calculates position coordinates of the touch event and reports them to a system control unit.

According to an embodiment of the present invention, if it is determined that a touch event occurs, the signal processing unit calculates position coordinates of the touch event on the capacitive touch screen and reports them to the system control unit. The system control unit may perform a corresponding control process according to the position coordinates.

According to an embodiment of the present invention, a sensing electrode of the touch detection system receives a square wave signal form the tip of a touch stylus, a sensing detection unit performs a detection process on the square wave signal, and a signal processing unit determines whether a touch event occurs according to the square wave signal processed with the detection process and calculates position coordinates of the touch event and report them to a system control unit if a touch event occurs. In this embodiment of the present invention, the touch stylus functions as a sending electrode to send the square wave signal, and the touch detection system determines whether a touch event occurs according to the square wave signal sent from the touch stylus, instead of the touch detection system itself providing a sending electrode to send a square wave signal and receiving a square wave signal through an own receiving electrode, without the requirement of a touch stylus or a human finger touching the touch detection system to change the capacitance of the touch detection system. As a result, it is no longer needed for the contact area between the touch stylus or the human finger and the touch detection system to be a circular area with a diameter of at least 5 mm. Therefore, the touch stylus provided by the embodiment of the present invention permits touch actions having good accuracy, provides a high success rate of touch, and is suitable to be used on the occasion when one wants to write.

Figure 4:
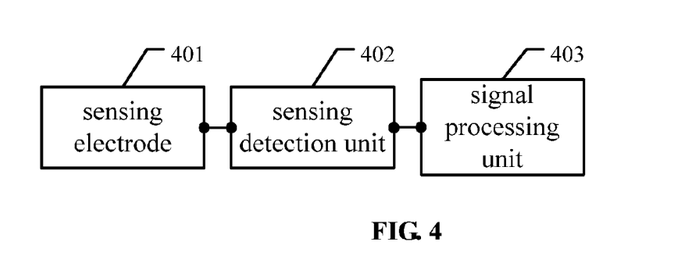
FIG. 4 is a schematic structural diagram of a touch detection system according to an embodiment of the present invention.

A touch detection method provided by an embodiment of the present invention is described above, and a touch detection system which implements the touch detection method according to an embodiment of the present invention will be described hereinafter. As shown in FIG. 4, the touch detection system includes a sensing electrode 401, a sensing detection unit 402, and a signal processing unit 403.

The sensing electrode 401 is adapted to receive a square wave signal sent from a stylus tip of a touch stylus.

The sensing detection unit 402 is adapted to perform a detection process on the square wave signal and send the processed square wave signal to the signal processing unit 403, the sensing detection unit 402 having a clock synchronized with a clock of the touch stylus.

The signal processing unit 403 is adapted to determine whether a touch event occurs according to the square wave signal processed with the detection process.

The signal processing unit 403 is further adapted to calculate position coordinates of the touch event and report them to a system control unit if a touch event occurs.

Figure 5:
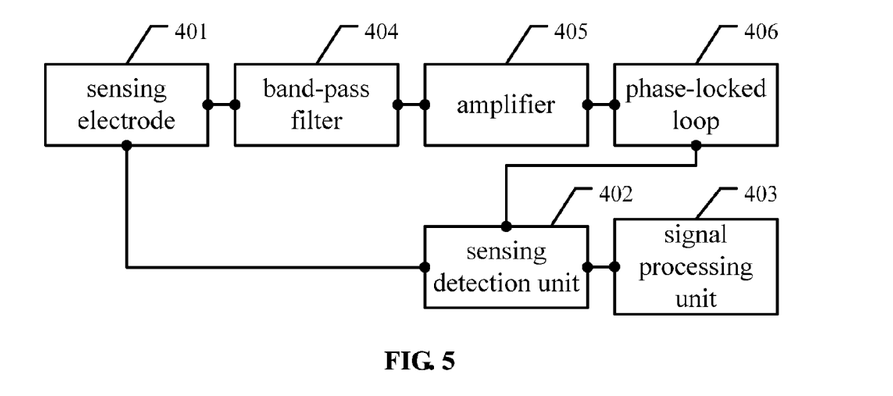
FIG. 5 is another schematic structural diagram of a touch detection system according to an embodiment of the present invention.

It is noted that, as shown in FIG. 5, in comparison with FIG. 4, the touch detection system provided by an embodiment of the present invention may further include:

a band-pass filter 404, adapted to perform frequency selection on the square wave signal;

an amplifier 405, adapted to amplify the frequency-selected square wave signal; and a PLL 406, adapted to perform phase adjustment and frequency multiplication on the amplified square wave signal, and outputs the result to the sensing detection unit 402, which uses the result of frequency multiplication as the clock of the sensing detection unit 402.

Figure 6:
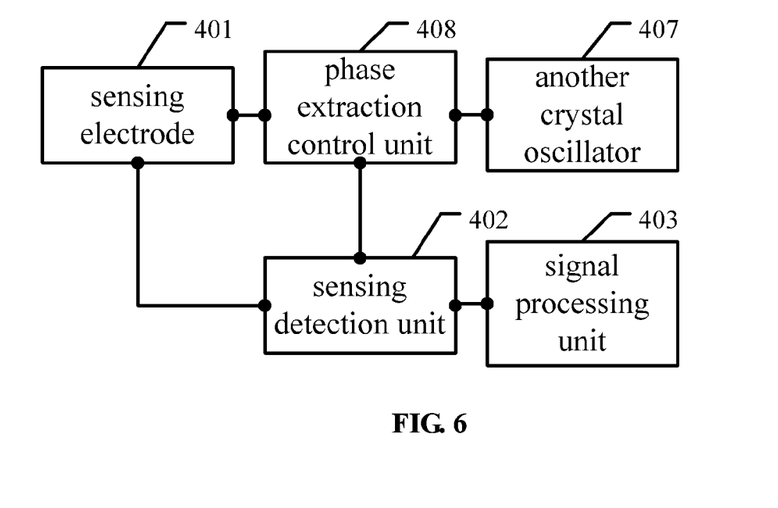
FIG. 6 is another schematic structural diagram of a touch detection system according to an embodiment of the present invention.

It is noted that, as shown in FIG. 6, in comparison with FIG. 4, if the clock of the touch stylus is generated by a crystal oscillator, the touch detection system provided by an embodiment of the present invention may further include:

another crystal oscillator 407, adapted to generate a clock and outputs it to a phase extraction control unit 408, and having a frequency that is the same as the frequency of the crystal oscillator, or a multiple of the frequency of the crystal oscillator, or a unit fraction of the frequency of the crystal oscillator; and the phase extraction control unit 408, adapted to extract phase information of the touch stylus from the square wave signal received by the sensing electrode 401.

The phase extraction control unit 408 is further adapted to perform phase adjustment on the clock output by said another crystal oscillator to the phase extraction control unit according to the phase information.

The phase extraction control unit 408 is further adapted to output the phase-adjusted clock to the sensing detection unit 402, which uses the phase-adjusted clock as its own clock.

Figure 7:
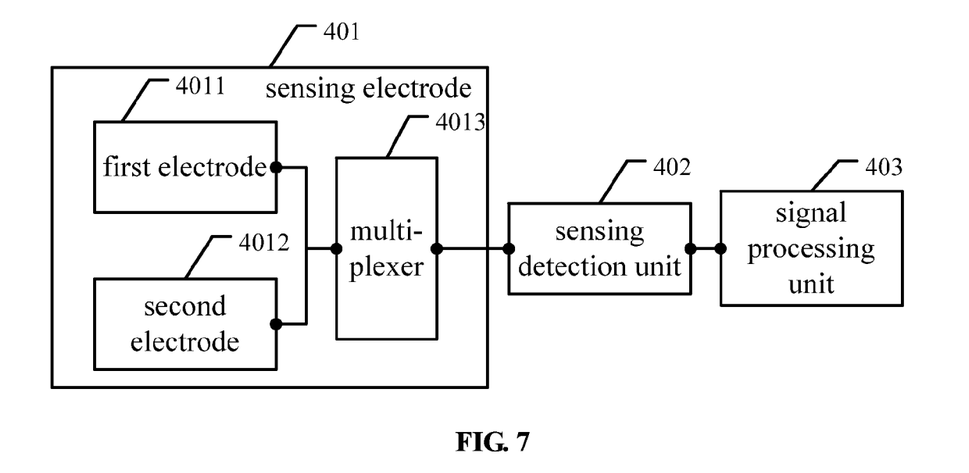
FIG. 7 is another schematic structural diagram of a touch detection system according to an embodiment of the present invention.

As shown in FIG. 7, in practice, the sensing electrode 401 may include a first electrode 4011, a second electrode 4012 and a multiplexer 4013.

The first electrode 4011 is adapted to receive the square wave signal sent from the stylus tip of the touch stylus.

The second electrode 4012 is adapted to receive the square wave signal sent from the stylus tip of the touch stylus.

The multiplexer 4013 is adapted to send each of the square wave signal received by the first electrode 4011 and the square wave signal received by the second electrode 4012 to the sensing detection unit.

It is noted that, the touch detection system provided by an embodiment of the present invention receives a square wave signal from the touch stylus and then performs detection and determination. For the compatibility with the touch detection mode in the prior art (which may also be referred to as an ordinary touch operation mode), the first electrode may further be adapted to send a square wave signal to the second electrode, the second electrode may further be adapted to receive the square wave signal sent from the first electrode, and the multiplexer may further be adapted to send the square wave signal received by the second electrode to the sensing detection unit. Generally, the first electrode may be an original sending electrode of the touch detection system and send a square wave signal to the second electrode, the second electrode may be an original receiving electrode of the touch detection system and receive the square wave signal sent from the first electrode, and the sensing detection unit may obtain the square wave signal from the second electrode, which may then be processed by the signal processing unit. According to a touch detection method provided by an embodiment of the present invention (which may also be referred to as an active stylus operating mode), both the first electrode and the second electrode may be used as a receiving electrode for receiving the square wave signal sent from the stylus tip of the touch stylus. In order to avoid an additional sensing detection unit for detection on the square wave signal sent from the first electrode, a multiplexer may be added into the sensing electrode of the touch detection system, and the multiplexer sends each of the square wave signal received by the first electrode and the square wave signal received by the second electrode to the sensing detection unit.

A touch detection system provided by an embodiment of the present invention is described below. The touch detection system can operate under both the ordinary touch operating mode and the active stylus operating mode. The touch screen system may firstly perform an ordinary touch operating mode detection, which includes the first electrode sending a square wave signal, the second electrode receiving the square wave signal, and the sensing detection unit performing detection on the square wave signal sent from the second electrode. On completion of the ordinary touch operating mode detection, the touch detection system may enter the active stylus operating mode. Under this mode, both electrodes (i.e., the first electrode and the second electrode) become a receiving electrode, with the touch stylus being the only sending electrode. Both the first electrode and the second electrode receive a square wave signal sent from the touch stylus, the multiplier sends each of the received square wave signals to the sensing detection unit, the sensing detection unit performs detection on the square wave signal, and the signal processing unit determines whether a touch event occurs under the ordinary touch operating mode and determines whether a touch event occurs under the active stylus operating mode according to the square wave signal processed by the sensing detection unit, and if a touch event occurs, calculates such parameters as touch coordinates and reports the result to the system control unit. It is noted that, according to an embodiment of the present invention, the active stylus operating mode may be carried out before the ordinary touch operating mode, then the sensing detection unit sends detection data to the signal processing unit, and the signal processing unit determines whether a touch event occurs under the ordinary touch operating mode and determines whether a touch event occurs under the active stylus operating mode according to the detection data, and if a touch event occurs, calculates such parameters as touch coordinates and reports the result to the system control unit.

Figure 8:
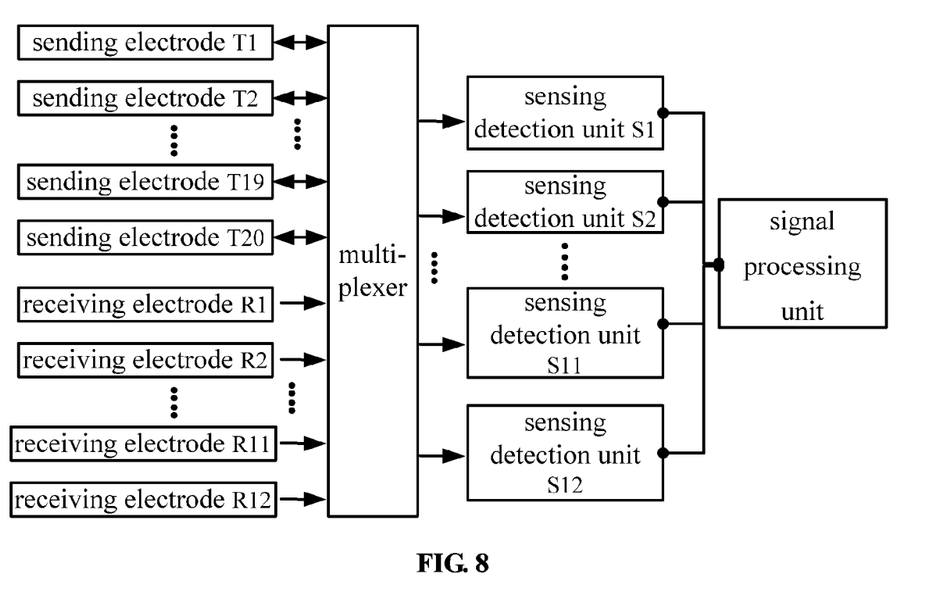
FIG. 8 is another schematic structural diagram of a touch detection system according to an embodiment of the present invention.

An example with a practical scenario is described below. When the touch detection system works under the active stylus operating mode, the touch stylus functions as the only sending electrode, and both the first electrode and the second electrode function as a receiving electrode in the active stylus operating mode. In practice, all the electrodes may be transformed into receiving electrodes by time-division multiplexing using a multiplier. For example, as shown in FIG. 8, the touch detection system includes twenty sending electrodes T1~T20, twelve receiving electrodes R1~R12, and twelve sensing detection units S1~S12. Once the active stylus operating mode is entered, all the sending electrodes T1~T20 stop sending signals, and the touch stylus functions as the only sending electrode and sends a square wave signal. In the first touch stylus detection cycle, the touch stylus actively sends the square wave signal, T1~T20 are all connected to the ground or the AC power ground, R1~R12 receive the square wave signal and send it to the sensing detection units S1~S12 respectively, and the sensing detection units S1~S12 perform detection on the signal and send the result to the signal processing unit. In the second touch stylus detection cycle, T1~T12 are connected to S1~S12 respectively, T13~T20 are connected to the ground or the AC power ground, R1~R12 are connected to the ground or the AC power ground, and the sensing detection units S1~S12 perform detection on the signal and send the result to the signal processing unit. In the third touch stylus detection cycle, T1~T12 are connected to the ground or the AC power ground, T13~T20 are connected to S1~S8, R1~R12 are connected to the ground or the AC power ground, the inputs of S9~S12 are open or S9~S12 are stopped by an enabling signal, and the sensing detection units S1~S8 perform detection on the signal and send the result to the signal processing unit. On completion of the three touch stylus detection cycles, the signal processing unit processes the square wave signals collected from the three cycles, and if it is determined that an touch event occurs, calculates the coordinates in the horizontal axis and the vertical axis respectively and reports the calculation result to the system control unit.

It is noted that, information interaction and process processing between the modules/units of the above device are based on the same idea as the method embodiments of the present invention, and their technical effects are similar to those of the method embodiments of the present invention described above with reference to FIG. 3, hence the technical effects are omitted here.

According to another embodiment of the present invention, a sensing electrode of the touch detection system receives a square wave signal form the tip of a touch stylus, a sensing detection unit performs a detection process on the square wave signal, and a signal processing unit determines whether a touch event occurs according to the square wave signal processed with the detection process and calculates position coordinates of the touch event and report them to a system control unit if a touch event occurs. In this embodiment of the present invention, the touch stylus functions as a sending electrode to send the square wave signal, and the touch detection system determines whether a touch event occurs according to the square wave signal sent from the touch stylus, instead of the touch detection system itself providing a sending electrode to send a square wave signal and receiving a square wave signal through an own receiving electrode, without the requirement of a touch stylus or a human finger touching the touch detection system to change the capacitance of the touch detection system. As a result, it is no longer needed for the contact area between the touch stylus or the human finger and the touch detection system to be a circular area with a diameter of at least 5 mm. Therefore, the touch stylus provided by the embodiment of the present invention permits touch actions having good accuracy, provides a high success rate of touch, and is suitable to be used on the occasion when one wants to write.

Those skilled in the art will understand that all or some of the steps of the above method embodiments may be performed by a program instructing related hardware. The program may be stored in a computer-readable storage medium such as a read-only memory (ROM), a magnetic disk or an optical disc.

A touch stylus, a touch detection method and a touch detection system according to the present invention are described in detail above, and modifications may be made by those skilled in the art to the specific embodiments and the applications disclosed herein based on the idea of the embodiments of the present invention. Therefore, the disclosure herein shall not be considered as limiting the scope of the present invention.

The invention claimed is:

1. A touch stylus, comprising a stylus tip and a stylus body, wherein,
the stylus tip is connected to the stylus body, the stylus body is provided with a cavity in which a driving circuit board and a battery are arranged, the driving circuit board is electrically connected to the stylus tip, the battery is adapted to supply electrical energy to the driving circuit board, and the driving circuit board is adapted to generate a square wave signal and send the square wave signal to a touch detection system through the stylus tip, so that the touch detection system determines whether a touch event occurs according to the square wave signal;
wherein the touch stylus has a clock synchronized with a clock of a sensing detection unit of the touch detection system;
wherein the driving circuit board comprises a crystal oscillator, a first voltage boosting circuit, a second voltage boosting circuit, and a level converter, wherein
the first voltage boosting circuit is connected to the battery, the battery being adapted to supply electrical energy to the first voltage boosting circuit;
the first voltage boosting circuit is connected to the crystal oscillator, and adapted to supply electrical energy to the crystal oscillator;
the second voltage boosting circuit is connected to the first voltage boosting circuit and the level converter, and adapted to supply electrical energy for the level converter; and
the level converter is connected to the crystal oscillator, and adapted to perform level conversion on a square wave signal output by the crystal oscillator and send a result to the stylus tip.

2. The touch stylus according to claim 1, wherein the driving circuit board further comprises a pressure sensor, wherein the pressure sensor is connected to the level converter and adapted to collect a magnitude of the pressure in the touch detection system through the stylus tip and send the magnitude of the pressure to the level converter.

3. The touch stylus according to claim 1, further comprising a control switch, wherein the control switch is connected to the driving circuit board, and wherein the stylus tip sends the square wave signal to the touch detection system when the control switch is closed, and stops sending a square wave signal to the touch detection system when the control switch is open.

4. The touch stylus according to claim 1, further comprising an indicating device, wherein the indicating device is connected to the driving circuit board and adapted to indicate an operation status of the touch stylus.

5. A touch detection method, comprising:
receiving, by a sensing electrode, a square wave signal sent from a stylus tip of a touch stylus;
performing a detection process on the square wave signal, by a sensing detection unit, the sensing detection unit having a clock synchronized with a clock of the touch stylus;
determining, by a signal processing unit, whether a touch event occurs according to the square wave signal processed with the detection process; and
calculating position coordinates of the touch event and reporting the position coordinates to a system control unit, by the signal processing unit, if a touch event occurs;

wherein when the clock of the touch stylus is generated by a crystal oscillator, synchronization between the clock of the sensing detection unit and the clock of the touch stylus is performed by:
generating a clock and outputting the clock to a phase extraction control unit, by another crystal oscillator having a frequency that is the same as a frequency of the crystal oscillator, or a multiple of the frequency of the crystal oscillator, or a unit fraction of the frequency of the crystal oscillator;
extracting, by the phase extraction control unit, phase information of a signal sent from the touch stylus from the square wave signal received by the sensing electrode;
performing phase adjustment on the clock output by said another crystal oscillator to the phase extraction control unit, by the phase extraction control unit, according to the phase information; and
outputting, by the phase extraction control unit, the phase-adjusted clock to the sensing detection unit, wherein the sensing detection unit uses the phase-adjusted clock as its own clock.

6. The touch detection method according to claim 5, wherein synchronization between the clock of the sensing detection unit and the clock of the touch stylus is performed by:
performing frequency selection, by a band-pass filter, on the square wave signal;
amplifying, by an amplifier, the frequency-selected square wave signal; and
performing phase adjustment and frequency multiplication on the amplified square wave signal, and outputting a result to the sensing detection unit, by a phase-locked loop (PLL), wherein the sensing detection unit uses the result of frequency multiplication as the clock of the sensing detection unit.

7. A touch detection system, comprising a sensing electrode, a sensing detection unit, and a signal processing unit, wherein,
the sensing electrode is adapted to receive a square wave signal sent from a stylus tip of a touch stylus;
the sensing detection unit is adapted to perform a detection process on the square wave signal and send a result to the signal processing unit, the sensing detection unit having a clock synchronized with a clock of the touch stylus;
the signal processing unit is adapted to determine whether a touch event occurs according to the square wave signal processed with the detection process;
the signal processing unit is further adapted to calculate position coordinates of the touch event and report the position coordinates to a system control unit if a touch event occurs;
wherein when the clock of the touch stylus is generated by a crystal oscillator, the touch detection system further comprises:
another crystal oscillator, adapted to generate a clock and output the clock to a phase extraction control unit, wherein said another crystal oscillator has a frequency that is the same as a frequency of the crystal oscillator, or a multiple of the frequency of the crystal oscillator, or a unit fraction of the frequency of the crystal oscillator; and
the phase extraction control unit, adapted to extract phase information of the touch stylus from the square wave signal received by the sensing electrode,
wherein the phase extraction control unit is further adapted to perform, according to the phase information, phase adjustment on the clock output by said another crystal oscillator to the phase extraction control unit; and
the phase extraction control unit is further adapted to output the phase-adjusted clock to the sensing detection unit, wherein the sensing detection unit uses the phase-adjusted clock as its own clock.

8. The touch detection system according to claim 7, wherein the sensing electrode comprises a first electrode, a second electrode and a multiplexer, wherein,
the first electrode is adapted to receive the square wave signal sent from the stylus tip of the touch stylus;
the second electrode is adapted to receive the square wave signal sent from the stylus tip of the touch stylus; and
the multiplexer is adapted to send each of the square wave signal received by the first electrode and the square wave signal received by the second electrode to the sensing detection unit.

9. The touch detection system according to claim 8, wherein:
the first electrode is further adapted to send a square wave signal to the second electrode;
the second electrode is further adapted to receive the square wave signal sent from the first electrode; and
the multiplexer is further adapted to send the square wave signal received by the second electrode to the sensing detection unit.

10. The touch detection system according to claim 7, further comprising:
a band-pass filter, adapted to perform frequency selection on the square wave signal;
an amplifier, adapted to amplify the frequency-selected square wave signal; and
a phase-locked loop (PLL), adapted to perform phase adjustment and frequency multiplication on the amplified square wave signal, and output a result to the sensing detection unit, wherein the sensing detection unit uses the result of frequency multiplication as the clock of the sensing detection unit.

* * * * *